(12) United States Patent
Bryant et al.

(10) Patent No.: US 7,864,708 B1
(45) Date of Patent: Jan. 4, 2011

(54) METHOD AND APPARATUS FOR FORWARDING A TUNNELED PACKET IN A DATA COMMUNICATIONS NETWORK

(75) Inventors: Stewart Frederick Bryant, Redhill (GB); Ian Michael Charles Shand, Cobham (GB)

(73) Assignee: Cisco Technology, Inc., San Jose, CA (US)

(*) Notice: Subject to any disclaimer, the term of this patent is extended or adjusted under 35 U.S.C. 154(b) by 1032 days.

(21) Appl. No.: 10/620,866

(22) Filed: Jul. 15, 2003

(51) Int. Cl.
*H04L 12/28* (2006.01)

(52) U.S. Cl. .................. 370/255; 370/238; 370/256; 370/392; 709/241; 709/252

(58) Field of Classification Search .......... None
See application file for complete search history.

(56) References Cited

U.S. PATENT DOCUMENTS

| | | | |
|---|---|---|---|
| 5,243,592 A | 9/1993 | Perlman et al. | |
| 5,253,248 A | 10/1993 | Dravida et al. | |
| 5,999,286 A | 12/1999 | Venkatesan | |
| 6,002,674 A | 12/1999 | Takei et al. | |
| 6,032,194 A | 2/2000 | Gai et al. | |
| 6,061,650 A * | 5/2000 | Malkin et al. | 704/228 |
| 6,092,113 A * | 7/2000 | Maeshima et al. | 709/230 |
| 6,128,750 A | 10/2000 | Espy et al. | |
| 6,148,410 A | 11/2000 | Basket et al. | |
| 6,243,754 B1 | 6/2001 | Guerin et al. | |
| 6,256,295 B1 | 7/2001 | Callon | |
| 6,321,271 B1 | 11/2001 | Kodialam et al. | |
| 6,349,091 B1 | 2/2002 | Li | |
| 6,389,764 B1 | 5/2002 | Stubler et al. | |
| 6,473,421 B1 | 10/2002 | Tappan | |
| 6,507,577 B1 | 1/2003 | Mauger et al. | |
| 6,535,481 B1 | 3/2003 | Andersson et al. | |
| 6,578,084 B1 | 6/2003 | Moberg et al. | |
| 6,578,086 B1 | 6/2003 | Regan et al. | |
| 6,636,498 B1 | 10/2003 | Leung | |
| 6,654,361 B1 | 11/2003 | Dommety et al. | |
| 6,668,282 B1 | 12/2003 | Booth et al. | |
| 6,697,325 B1 | 2/2004 | Cain | |
| 6,711,125 B1 | 3/2004 | Walrand et al. | |
| 6,765,896 B1 * | 7/2004 | Ahmed et al. | 370/338 |
| 6,829,215 B2 | 12/2004 | Tornar | |

(Continued)

FOREIGN PATENT DOCUMENTS

CN  1440159 A  9/2003

(Continued)

OTHER PUBLICATIONS

International Searching Authority, International Search Report, PCT/US04/33827, dated Mar. 28, 2005, 8 pages.

(Continued)

*Primary Examiner*—Jayanti K. Patel
*Assistant Examiner*—Anthony Sol
(74) *Attorney, Agent, or Firm*—Hickman Palermo Truong & Becker LLP

(57) ABSTRACT

A method is described for forwarding a tunneled packet in a data communications network. A header of the tunneled packet is removed at a forwarding node neighboring the tunnel end point, and the payload is forwarded.

26 Claims, 12 Drawing Sheets

U.S. PATENT DOCUMENTS

| | | | |
|---|---|---|---|
| 6,944,131 B2 | 9/2005 | Beshai et al. | |
| 6,965,937 B2* | 11/2005 | Gaddis et al. | 709/227 |
| 6,973,057 B1* | 12/2005 | Forslow | 370/328 |
| 6,982,951 B2 | 1/2006 | Doverspike et al. | |
| 7,061,921 B1* | 6/2006 | Sheth | 370/395.52 |
| 7,009,286 B1 | 8/2006 | Swallow | |
| 7,113,481 B2 | 9/2006 | Elie-Dit-Cosaque et al. | |
| 7,158,486 B2 | 1/2007 | Rhodes | |
| 7,242,664 B2 | 7/2007 | Einstein et al. | |
| 7,274,654 B2 | 9/2007 | Yang et al. | |
| 7,274,658 B2 | 9/2007 | Bornstein et al. | |
| 7,349,427 B1* | 3/2008 | Canning et al. | 370/466 |
| 7,490,165 B1 | 2/2009 | Katukam et al. | |
| 2002/0037010 A1* | 3/2002 | Yamauchi | 370/395.53 |
| 2002/0069292 A1* | 6/2002 | Gaddis et al. | 709/238 |
| 2002/0093954 A1 | 7/2002 | Weil et al. | |
| 2002/0116669 A1 | 8/2002 | Jain | |
| 2002/0131362 A1 | 9/2002 | Callon | |
| 2002/0136223 A1* | 9/2002 | Ho | 370/395.51 |
| 2002/0171886 A1 | 11/2002 | Wu et al. | |
| 2003/0053414 A1* | 3/2003 | Akahane et al. | 370/216 |
| 2003/0063613 A1 | 4/2003 | Carpini et al. | |
| 2003/0123457 A1 | 7/2003 | Koppol | |
| 2004/0001497 A1 | 1/2004 | Sharma | |
| 2004/0001508 A1* | 1/2004 | Zheng et al. | 370/466 |
| 2004/0004955 A1* | 1/2004 | Lewis | 370/351 |
| 2004/0028064 A1* | 2/2004 | Cetin et al. | 370/409 |
| 2004/0071089 A1 | 4/2004 | Bauer et al. | |
| 2004/0085894 A1 | 5/2004 | Wang et al. | |
| 2004/0088389 A1* | 5/2004 | Shah | 709/221 |
| 2004/0107287 A1* | 6/2004 | Ananda et al. | 709/230 |
| 2004/0151181 A1* | 8/2004 | Chu et al. | 370/392 |
| 2004/0185777 A1* | 9/2004 | Bryson | 455/41.1 |
| 2004/0205239 A1* | 10/2004 | Doshi et al. | 709/241 |
| 2004/0223497 A1* | 11/2004 | Sanderson et al. | 370/395.52 |
| 2005/0031339 A1 | 2/2005 | Qiao et al. | |
| 2005/0073958 A1 | 4/2005 | Atlas et al. | |
| 2005/0097219 A1 | 5/2005 | Goguen et al. | |
| 2005/0152289 A1* | 7/2005 | Nagata et al. | 370/256 |
| 2006/0007929 A1* | 1/2006 | Desai et al. | 370/389 |
| 2006/0291391 A1 | 12/2006 | Vasseur et al. | |
| 2007/0011284 A1 | 1/2007 | Le Roux et al. | |
| 2007/0291790 A1 | 12/2007 | Ue et al. | |
| 2008/0192762 A1* | 8/2008 | Kompella et al. | 370/410 |
| 2009/0080431 A1* | 3/2009 | Rekhter | 370/392 |

FOREIGN PATENT DOCUMENTS

| | | |
|---|---|---|
| WO | WO 01/78278 A1 | 10/2001 |
| WO | WO 02/06918 | 1/2002 |

OTHER PUBLICATIONS

Current Claims, PCT/US04/33827, 6 pages.
AU Examiner's First Report for foreign patent application No. 2004311004 dated Jun. 23, 2008 (1 pg).
AU Examiner's Second Report for foreign patent application No. 2004311004 dated Aug. 18, 2008 (1 pg).
Current claims for AU foreign patent application No. 2004311004 (6 pgs).
Office Action from CN for foreign application No. 200480033007.8 dated Apr. 11, 2008 (10 pgs) with English translation (11 pgs).
Current claims for CN foreign patent application No. 200480033007.8 (6 pgs).
European Patent Office, "Supplementary European Search Report", application No. EP 04795045, May 27, 2009, 4 pages.
Claims, application No. EP 04795045, 4 pages.
Raju et al., "A New Approach to On-Demand Loop-Free Multipath Routing", Computer Communications and Networks, 1999, IEEE, Oct. 1999, XP010359531, ISBN: 978-0/7803-5794-5, 6 pages.
European Patent Office, "Communication pursuant to Article 94(3) EPC", Application No. 04795045.6-2416, dated Sep. 7, 2009, 5 pages.
Current Claims, Application No. 04795045.6-2416, 5 pages.
U.S. Appl. No. 10/442,589, filed May 20, 2003, Stewart Frederick Bryant, et al., entitled "A Method and Apparatus for Constructing a Transition Route in a Data Communication Network," 62 pages, 2003.
U.S. Appl. No. 10/340,371, filed Jan. 9, 2003, Kevin George Miles, et al., entitled Method and Apparatus for Constructing a Backup Route in a Data Communications Network, 44 pages, 2003.
Cisco Systems, Inc., "Tunnel ToS," Cisco IOS Release 12.0(17)S, 12.0(17)ST, 12.2(8)T, and 12.2(14)S, Jan. 28, 2003, pp. 1-15.
Cisco Systems, Inc., "AppleTalk, IP, and Novell IPX Overview," Sep. 9, 2002, pp. IV-1-IV-6.
Cisco Systems, Inc., "Why Are OSPF Neighbors Struck in Exstart/Exchange State?," 1992-2003, 8 pages.
Mikkel Torup, "Fortifying OSPF/IS-IS against link-failure," Sep. 7, 2001, pp. 1-10.
Cisco Systems, Inc., "Trace," Chapter 32, Sep. 13, 2002, pp. 32-1-32-12.
Wang, Zheng et al., "Shortest Path First with Emergency Exits," ACM 089791-405-8/90/0009/0166, 1990, pp. 166-176.
Moy, J et al., "OSPF Version 2", IETF Standard, Network Working Group, Internet Engineering Task Force, IEFT, Apr. 1998, XP015008112, NFC 2328, 245 pages.
European Patent Office, "Supplementary Search Report", application No. EP 04812468, dated May 27, 2010, 4 pages.
Claims, application No. EP 04812468, 4 pages, May 27, 2010.
European Search Report, application No. EPO 06 80 0142, dated Jun. 15, 2010 (8 pgs).

* cited by examiner

METHOD AND APPARATUS FOR FORWARDING A TUNNELED PACKET IN A DATA COMMUNICATIONS NETWORK

FIELD OF THE INVENTION

The present invention generally relates to routing of data in a network. The invention relates more specifically to a method and apparatus for forwarding a tunneled packet in a data communications network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of links (communication paths such as telephone or optical lines) and nodes (usually routers directing the packet along one or more of a plurality of links connected to it) according to one of various routing protocols.

One class of routing protocol is the link state protocol. The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB), which is a map of the entire network topology and from that constructs generally a single optimum route to each available node based on an appropriate algorithm such as, for example, a shortest path first (SPF) algorithm. As a result a "spanning tree" is constructed, rooted at the node and showing an optimum path including intermediate nodes to each available destination node. Because each node has a common LSDB (other than when advertised changes are propagating around the network) any node is able to compute the spanning tree rooted at any other node. The results of the SPF are stored in a routing information base (RIB) and based on these results the forwarding information base (FIB) or forwarding table is updated to control forwarding of packets appropriately.

As a result, when a packet for a destination node arrives at a node (the "first node"), the first node identifies the optimum route to that destination and forwards the packet to the next node along that route. The next node repeats this step and so forth. In some circumstances it is desirable to have more control over the route that a packet takes in which case "tunneling" can be used. According to this scheme if a node A receives a packet destined for node Z and for some reason it is desired that the packet should travel via node Y, under normal circumstances node A would have no control over this (unless Y was an adjacent node), as the route is dependent on the forwarding table generated as a result of the SPF at node A and any intermediate nodes as well. However node A can "tunnel" the packet to node Y by encapsulating the received packet within a packet having destination node Y and sending it to node Y which acts as the tunnel end point. When the packet is received at node Y it is decapsulated and Y then forwards the original packet to node Z according to its standard forwarding table. Yet further control is available using directed forwarding in which the encapsulated packet includes a specific instruction as to which neighboring node of the end point of the tunnel the encapsulated packet should be sent, which comprises the "release point". One well-known type of tunneling is Internet Protocol (IP) tunneling, in which the outer L3 header is an IP header, and the payload that it carries is an IP payload. Examples of such tunneling include Generic Routing Encapsulation (GRE) and IP/IP tunneling.

Unfortunately typical implementation performance is about 50% of normal IP forwarding. This is because the router first has to process the outer IP header to recognize the packet as one that terminates locally. It then strips the outer header(s), and processes the inner (payload) packet, which it then forwards towards its destination. The forwarding router accordingly effectively has to forward two packets, the first to itself, and the performance drops accordingly. In some implementations a two-stage pipeline is used. In a two-stage pipeline, one processor or hardware forwarder processes the packet outer and passes the payload to another similar processor, which processes the payload. The first processor then gets a new packet from the interfaced process itself. This approach reduces the latency of packet forwarding to a single packet time. However this increases forwarding performance at the cost of additional hardware. In some other implementations a common second pipeline stage is used, which is itself a bottleneck.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for forwarding a tunneled packet in a data communications network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Forwarding a Tunneled Packet
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method of forwarding a tunneled packet having a header identifying a tunnel end point and a payload in a data communications network. The method comprises the step at a forwarding node of recognizing a tunneled packet identifying a neighbor node to the forwarding node as tunnel end point. The method further comprises the step of removing the header and forwarding the payload to the neighbor node.

In other aspects, the invention encompasses a computer apparatus and a computer-readable medium configured to carry out the foregoing steps.

2.0 Structural and Functional Overview

Figure 1:
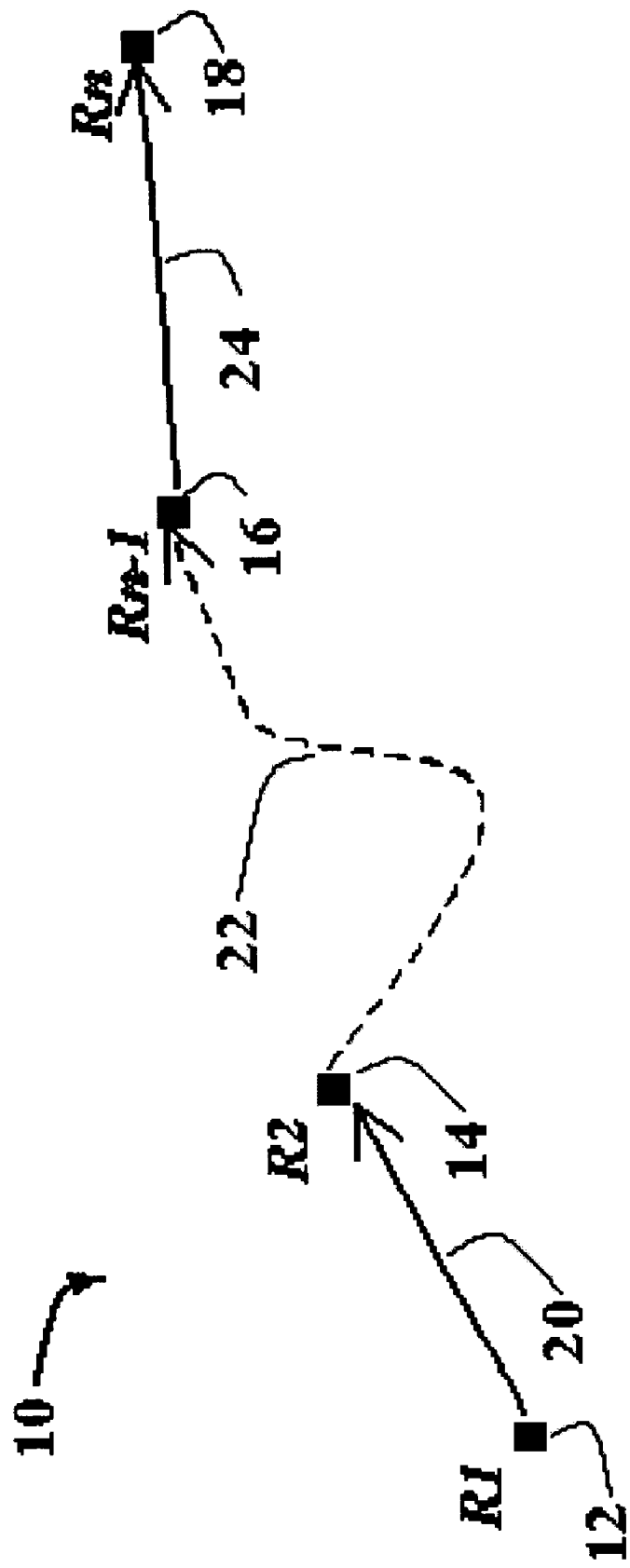
FIG. 1 is a representation of a network that illustrates an overview of a method for forwarding a tunneled packet.

The method can be further understood with respect to FIG. 1, which depicts an illustrative network diagram showing a method for forwarding a tunneled packet. The network comprises a data communications network of nodes and links, which can be the interne or a sub-network such as a routing domain or a virtual network which is designated generally 10 and which includes as nodes R1, reference numeral 12, R2, reference numeral 14, Rn−1 reference numeral 16 and Rn reference numeral 18. Nodes R1 and R2 are joined by link 20. The path between nodes R2 and Rn−1 is designated generally 22 and comprises a plurality of nodes joined by respective links (not shown). Nodes Rn−1 and Rn are joined by a link 24.

The network 10 comprises an IP network and, according to the method, an IP in IP tunnel is set up between nodes R1 and Rn. When a packet is tunneled from nodes R1 to Rn, node Rn−1, knowing that the tunnel end point is its neighbor node Rn, strips the outer IP header and any tunnel header present and then forwards the inner IP packet to node Rn. As a result, node Rn can process the packet with a single look up rather than needing to look up the destination address in the outer IP header, decide that the packet terminates at itself, discard the outer IP header and tunnel header and then perform a second lookup on the inner IP destination address. As a result the reduction in implementation performance is minimized.

Figure 2:
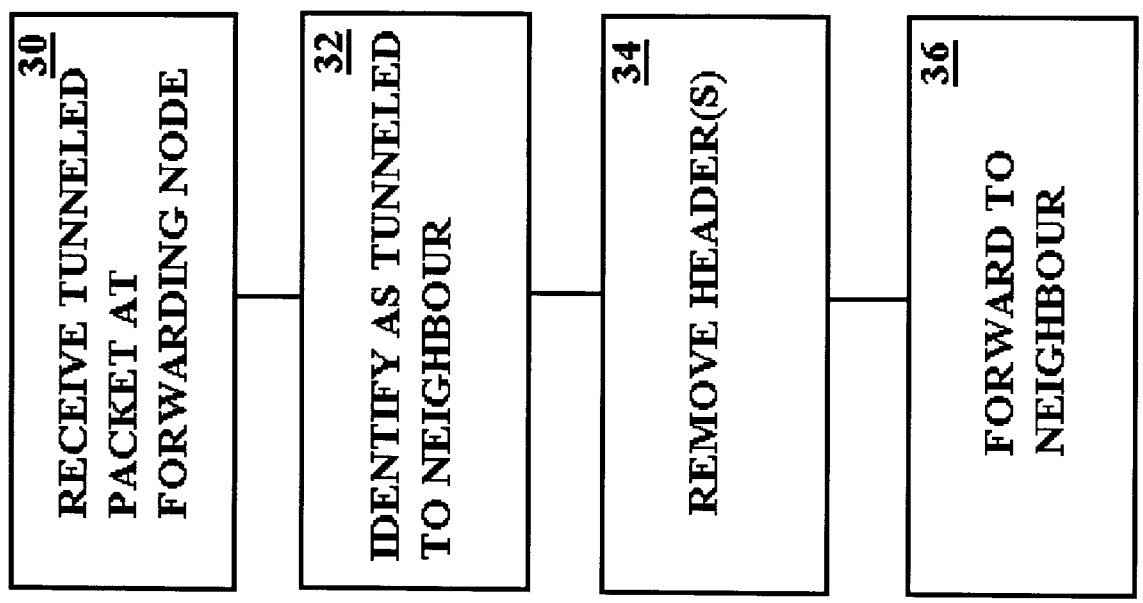
FIG. 2 is a flow diagram illustrating a high level view of a method for forwarding a tunneled packet.

FIG. 2 is a flow diagram illustrating a high level view of a method of forwarding a tunneled packet of the type described above with reference to FIG. 1. In block 30 the forwarding node, such as node Rn−1, 16, receives a tunneled packet and in block 32 the forwarding node identifies the packet as a tunneled packet with an end point at a neighbor node, e.g. node Rn, 18. In block 34 the forwarding node removes the outer IP header and any tunnel header and in block 36 the forwarding node forwards the inner IP packet to the neighbor node Rn. As a result, node Rn can process the packet with a single lookup.

The method can be implemented for static tunnels, as well as for automatically configured tunnels, such as repair tunnels around failures. The method and its optimizations are discussed in more detail below.

3.0 Method of Forwarding a Tunneled Packet

The method described herein can be implemented according to any appropriate routing protocol and where a network can support the tunnel and in which the neighbors of a tunnel end point know that they are neighbors. Generally, link state protocols such as Intermediate System to Intermediate System (IS-IS) or Open Shortest Path First (OSPF) are appropriate protocols. Link state protocols of this type are well understood by the skilled reader and are well documented in pre-existing documentation, and therefore are not described in detail here. However, alternative protocols can also be used to implement the method especially as, as will be understood from the following discussion, topology information is not required other than that a forwarding node knows that the packet is addressed to a neighbor node over a particular interface.

As discussed above, the forwarding node Rn−1, 16, identifies a packet being tunneled to its neighbor and strips off the appropriate headers. This reduces the processing burden on the tunnel end point at the neighboring node in particular by ensuring that there is only one lookup. The packet is of conventional form including an outer IP header with destination address Rn and source address R1, a tunnel header such as a GRE header, an inner IP header setting the destination address and source address of the payload and the payload itself.

In other embodiments, various other considerations can be taken into account. For example, a packet for a tunnel end point at node Rn may arrive via any adjacent node Rn−1 where there may be multiple such adjacent nodes. It is therefore desirable that all potential forwarding nodes or routers should be capable, configured and permitted to conduct the method described herein. However the method should be optional at the end point node Rn such that the end point has the capability to process the full set of headers for itself in the event that any Rn−1 forwarding node is not configured to or for some other reason does not carry out the method.

Bearing in mind that the tunnel could be statically configured or automatically configured for example to provide a repair path around a failed component it will be seen that the forwarding node Rn−1 needs to know that a neighboring node comprises a tunnel end point as well as a next hop and have the appropriate permissions to implement the method and the manner in which Rn−1 establishes this will depend upon the tunneling configuration.

In the case where the tunnel is statically configured, for example, using GRE, or IP in IP and manually configured tunnels, then the forwarding nodes or Rn−1 routers can be manually configured accordingly. Alternatively, a method of requesting, from the upstream nodes, the service provided by the method herein and of signaling permission for implementation, can be adopted as discussed in more detail below which allows scaling of the configuration. This approach may be used when there are significantly more forwarding Rn−1 nodes than there are Rn nodes in a network.

In the case where a tunnel is automatically configured, tunnel end point knowledge may be signaled as discussed below, but in some instances no information is signaled. In that case, all that is necessary is for the forwarding node to recognize that it is adjacent to the tunnel end point, and that it has a packet for the end point, which has been tunneled. The forwarding node can do this without any information other than that which is normally carried by the routing protocols, which will identify neighbor nodes. Although signaling may still be used to give permission for the method to be performed at the neighboring node, signaling such permission is optional, and embodiments using an automatically or manually configured tunnel may dispense with the signaling altogether in the circumstances.

Where signaling is adopted, then in the case either of static or automatic configuration, tunnel endpoint knowledge may be signaled by extending the feature signaling protocol to allow the tunnel endpoint node Rn to signal, to its neighbors, tunnel endpoint identifiers and permission to implement the method described herein. Such feature signaling protocols are well known to the skilled reader and are not described in detail here. Appropriate extensions will be apparent to the skilled reader. For example, the IS-IS hello may be extended, as discussed further below.

In cases where such a mechanism does not exist, then signaling methods such as a hello mechanism or a session mechanism of the type that will be familiar to the skilled reader can be used. In the case of the hello mechanism this provides a simple method of sending information directed solely at the immediate neighbors of the tunnel end point Rn. For example, an extension to a routing protocol hello, such as the IS-IS hello and/or the OSPF-hello, is provided to signal the set of tunnel end points on a router that require implementation of the method from its neighbors. In the case of RIP (Routing Information Protocols), this information could be carried using an appropriate new command type or a new specific hello mechanism to the present method may be defined.

In the case of a session mechanism, a session protocol such as TCP can also be used to carry the relevant information from Rn to its neighbors in a reliable manner. This requires a neighbor discovery protocol to establish the need for session establishment which is particularly beneficial when a router needed to advertise a significant number of tunnel endpoints, which may not fit into a hello message PDU (Protocol Data Unit).

In one embodiment, implementation of the method herein takes place with the permission of the router that is the tunnel endpoint, for example, node Rn. If the method is supported by a signaling protocol of the type described above then the permission is implicit in the signaling. Indeed, as the forwarding node will often have the remaining information required to implement the method, the main purpose of the signaling can be specifically to provide permission. However, if the additional information is signaled, then this can simplify implementation.

Figure 3:
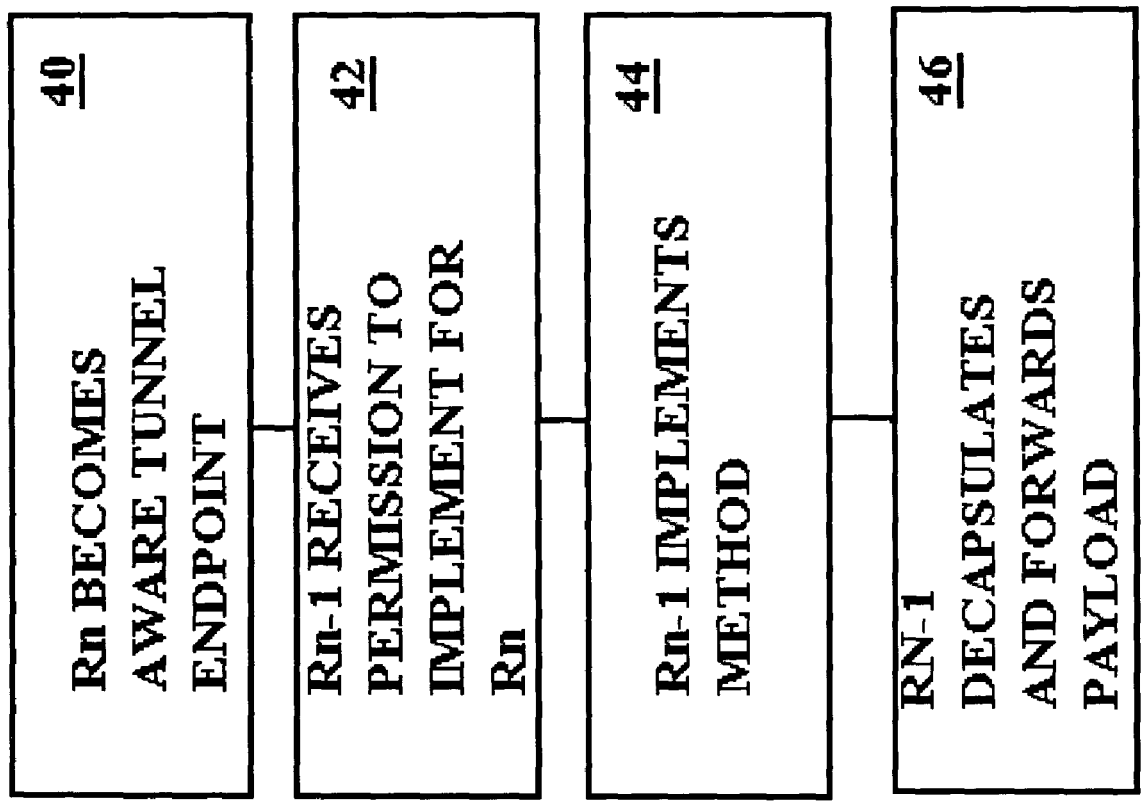
FIG. 3 is a flow diagram illustrating in more detail the steps involved in forwarding a tunneled packet.

FIG. 3 is a flow diagram illustrating in more detail the method described herein. In block 40 node Rn becomes aware that it is (or could be) a tunnel endpoint either by automatic tunnel institution or because it is manually configured so. In block 42 each node Rn−1 is notified that node Rn is a tunnel endpoint and permission to apply the method is granted which can either be by an appropriate signal protocol for example from node Rn or by manual configuration. In block 44 each node Rn−1 implements the method such that, in block 44, upon receipt of a packet with tunnel end point Rn, Rn−1 decapsulates at the packet and forwards the IP payload to Rn.

One example of an automatically configured tunnel, to which the method described herein is particularly well suited, is where a repair path is implemented comprising a backup or transition route around a failed component including a tunnel.

The manner in which the backup route is computed is described in co-pending patent application Ser. No. 10/340, 371, filed 9 Jan. 2003, entitled "Method and Apparatus for Constructing a Backup Route in a Data Communications Network" of Kevin Miles et al., ("Miles et al."), the entire contents of which are incorporated by reference for all purposes as if fully set forth herein and discussed in more detail below. According to the solution put forward in Miles et al where a first node detects failure of an adjacent node, then the first node computes a first set of nodes comprising the set of all nodes reachable according to its protocol other than nodes reachable by traversing the failed node. The first node then computes a second set of nodes comprising a set of all nodes from which a target node is reachable without traversing the failed node. The method then determines whether any intermediate nodes exist in the intersection between the first and second sets or nodes or a one-hop extension thereof and tunnels packets with target node D to a tunnel end point comprising a node in the intersection of the first and second sets of nodes. An extension of the approach is described in co-pending patent application Ser. No. 10/442,589, filed 20 May 2003, entitled "Method and Apparatus for Constructing a Transition Route in a Data Communications Network" of Stewart F. Bryant et al., the entire contents of which are incorporated by reference for all purposes as if fully set forth herein.

The method described herein can be implemented in relation to automatically configured repair paths of this type to reduce the decapsulation workload at the tunnel end point. This is particularly significant as there is the potential for significant traffic at the tunnel end points and as the tunnel end point address can be signaled in the link state protocols that support the implementation of the repair paths together with tunnel end point capability. Forwarding nodes comprising the neighbors Rn−1 to the end point node Rn will therefore know their topological relationship to the end point node and hence can automatically configure the method described herein; there are no processing operations that need to know that the packet arrived via a tunnel in which case any signaling protocol can be dispensed with.

Figure 4:
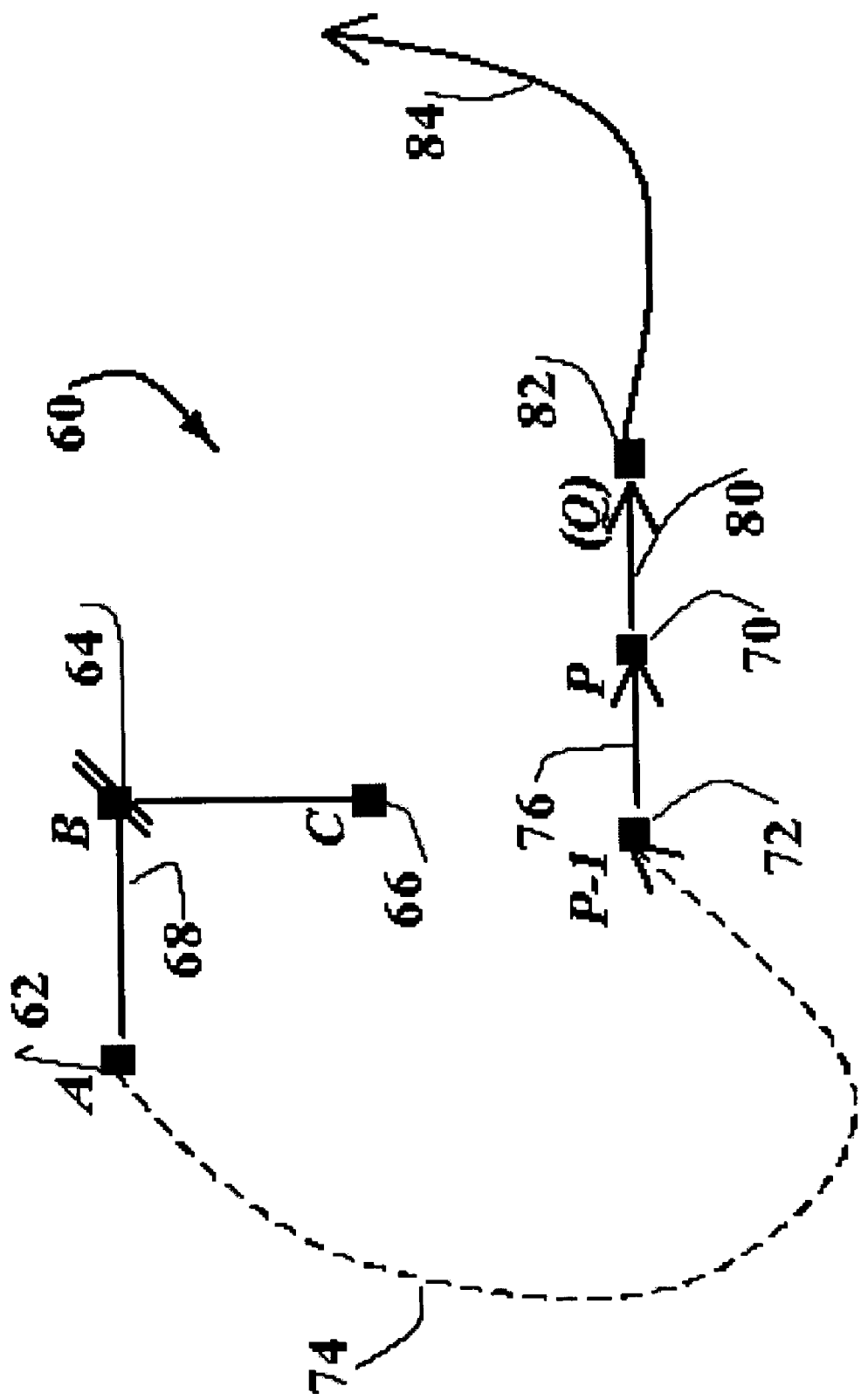
FIG. 4 is a representation of a network that illustrates a method for forwarding a tunneled packet along a transition route.

Implementation of the method in relation to repair tunnels can be understood with reference to FIG. 4 which is a network diagram showing implementation of a repair strategy to which the forwarding method is applied. The network is designated generally 60 and includes node A, reference numeral 62, a failed node B, reference numeral 64 and a further neighbor node C, reference numeral 66, to node B together with links 68 and 70 joining nodes A and B and nodes B and C respectively. As a result of the failure of node B, node A sets up a repair tunnel designated 74 to a node P, reference numeral 70 via a node P-1, reference numeral 72, neighboring node P and joined to it by link a 76. In normal operation according to Miles et al, node A tunnels a packet which otherwise would have had to go via node B around node B to node P. Node P (the repair tunnel destination) looks at the destination address of the encapsulating header, determines that the destination is itself, strips the header and forwards the packet towards its destination using normal forwarding or directed forwarding via link 80 and next hop node Q reference numeral 82. From node Q the packet is forwarded normally along route 84 towards its destination.

However according to the present method, all neighbors of node P which are capable of operating the backup route approach described in Miles et al, such as node P-1, know their topological relationship to P and hence can automatically configure themselves to perform the method described herein for any transition route tunnel that terminates at node P. Thus node P-1 determines that node P is the next hop and tunnel end point, strips the outer encapsulating header and then forwards the payload to node P without any further lookups. Node P thus receives the unencapsulated packet and can forward it normally with a single destination address lookup.

In some instances the forwarding node A, using normal forwarding, sends a packet via an indirect route to the neighboring node for example where the direct link cost to the neighboring node is high. One possible approach in such circumstances would be to strip the tunnel header and force the packet over the direct link to the neighboring node. Alternatively, the packet follows its normal forwarding route, and the node is responsible to ensure that the tunnel header is not stripped, as otherwise the payload could be forwarded by an intermediate node in the indirect route such that it did not traverse the tunnel end point. The latter approach avoids using the higher cost link.

In directed forwarding, the packet received at node P includes a specific instruction as to which neighboring node the packet should be sent (in this case node Q). In this case, two levels of encapsulating are used. The first encapsulation is to tunnel the packet to node P (the appropriate headers being stripped at node P-1). The second encapsulation is to forward the packet to node Q (appropriate headers of which are stripped at node P). As a result, only a single forwarding address lookup is carried out at each of nodes P-1, P and Q. Two approaches to doing this, using intermediate encapsulation, are described in more detail below.

In a first approach, intermediate encapsulation is carried out using an intermediate MPLS (Multi Protocol Label Switching) label. MPLS is a protocol that is well known to the skilled reader and which is described in document "Multi Protocol Label Switching Architecture" which is available at the time of writing on the file "rfc3031.txt" in the directory "rfc" of the domain "ietf.org" on the World Wide Web. According to MPLS, a complete path for a source-destination pair is pre-computed, and values required for forwarding a packet between adjacent routers in the path together with small headers or "labels" are pre-pended to the packet. The labels are used to direct the packet to the correct interface and next hop. The labels are included around the IP header allowing smaller outer headers.

In the MPLS approach, encapsulation between P and Q uses an MPLS label such that the repair encapsulation is IP/GRE/MPLS/IP-payload. Accordingly, P-1 strips the outer IP and GRE (tunnel) headers, P strips the MPLS header identifying node and interface Q as the next hop, and the packet arriving at node Q is the unencapsulated IP packet undergoing path repair. MPLS has the interface specific semantics required for directed forwarding and used in this manner does not need the full set of MPLS protocols to be enabled, although two switch paths are required, an MPLS path and an IP path.

In a second approach to intermediate encapsulation, double IP or "IP-in-IP" encapsulation can be adopted. In this approach, a second level of IP in IP encapsulation is used to tunnel the packet between node P and node Q such that the repair encapsulation becomes IP/GRE/IP/GRE/IP-payload. In this case, node P-1 strips the outer IP and GRE headers, node P strips the inner IP and GRE headers, and the packet arriving at node Q is the unencapsulated IP payload undergoing path repair. Of course other types of tunnel type than GRE can be used and other payloads such as MPLS payloads.

Figure 5:
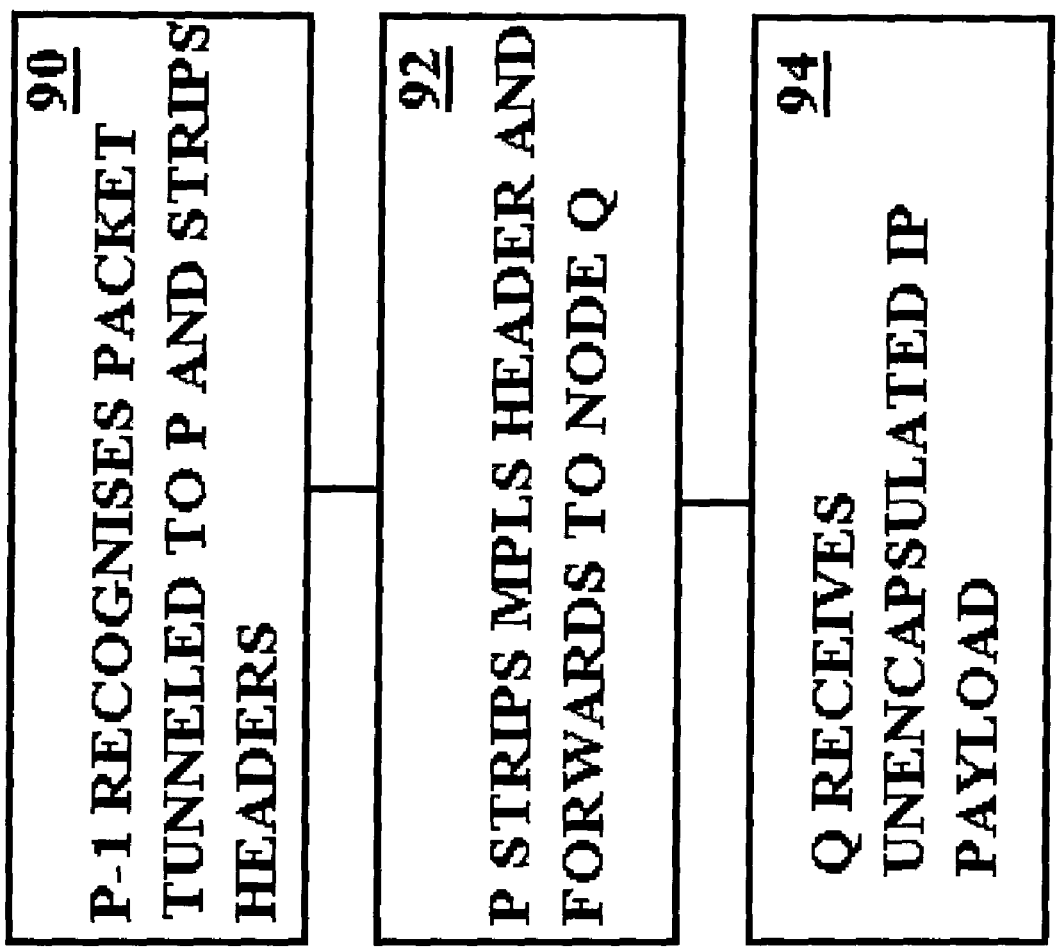
FIG. 5 is a flow diagram illustrating one method for forwarding an intermediate encapsulated packet.

The two approaches described above can be understood with reference to FIG. 5 and FIG. 6 respectively which are flow diagrams illustrating in more detail the intermediate encapsulation techniques. In the case of use of an intermediate MPLS label, with reference to FIG. 5, in block 90 node P-1 recognizes the packet as tunneled to node P and strips the outer headers. In block 92 node P strips the MPLS header and forwards the IP payload to node Q. In block 94 node Q receives the unencapsulated IP (or other) payload node undergoing path repair.

Figure 6:
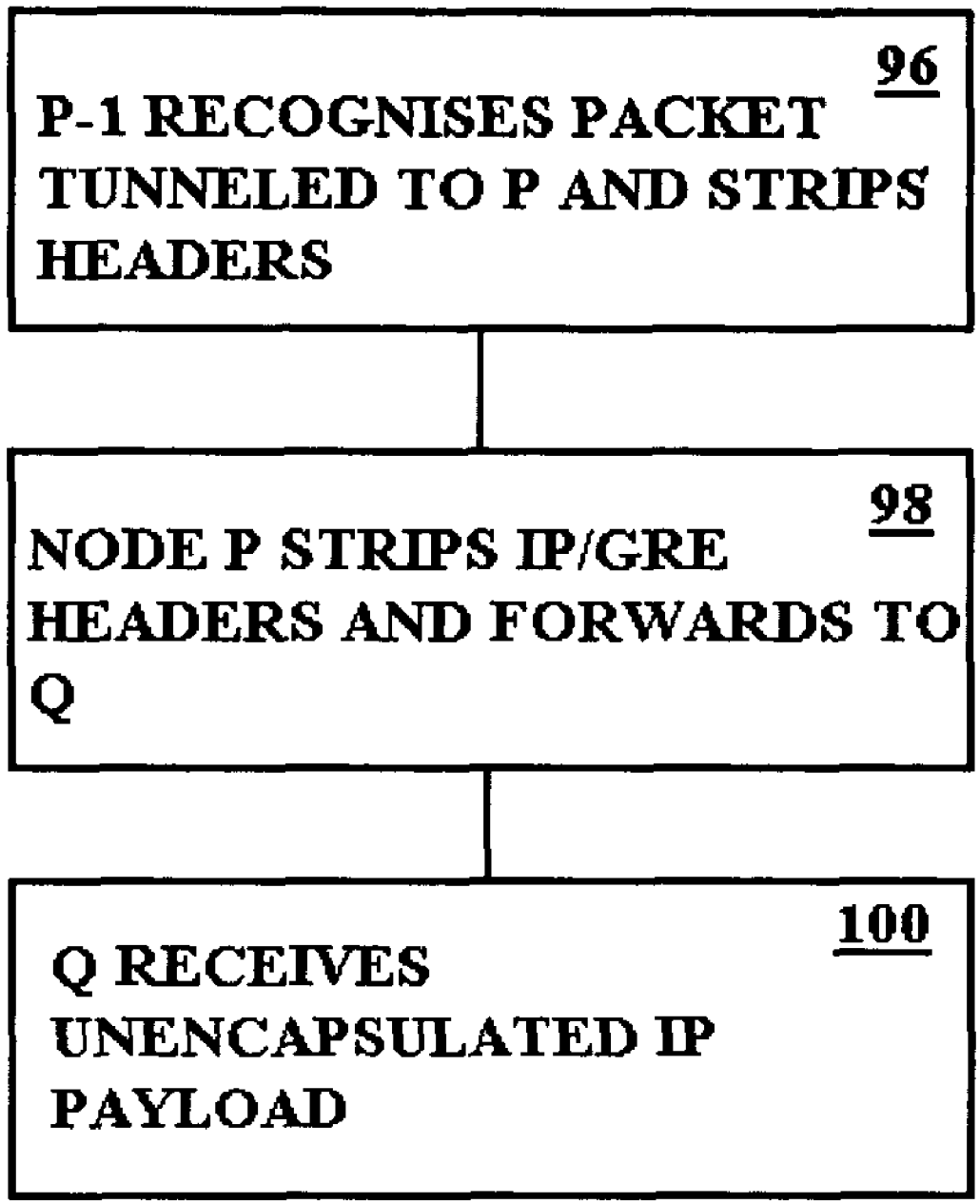
FIG. 6 is a flow diagram illustrating an alternative method for forwarding an intermediate encapsulated packet.

FIG. 6 is a flow diagram illustrating in more detail the method in the case of double IP encapsulation. In block 96, node P-1 recognizes that the packet is tunneled to node P and strips the outer IP and GRE headers, forwarding the payload which is still a tunneled packet to node P. In block 98 node P strips the inner IP and GRE headers and forwards the unencapsulated packet to node Q and at block 100 node Q receives the unencapsulated IP (or other) payload.

In the case of double IP encapsulation as described with reference to FIG. 6 directed forwarding can be greater than a single hop as a result of which repair paths can be instituted for an increased set of nodes downstream of the failed node B.

One approach to computing a repair path using such extended directed forwarding would be to run an SPF process (excising the set of nodes reachable over the failed component) at each of the nodes already determined to be reachable from the first node (by running its SPF) without traversing the failed component, for example running such an SPF at node P in FIG. 4. However, this could require the running of a large number of SPFs.

Figure 7:
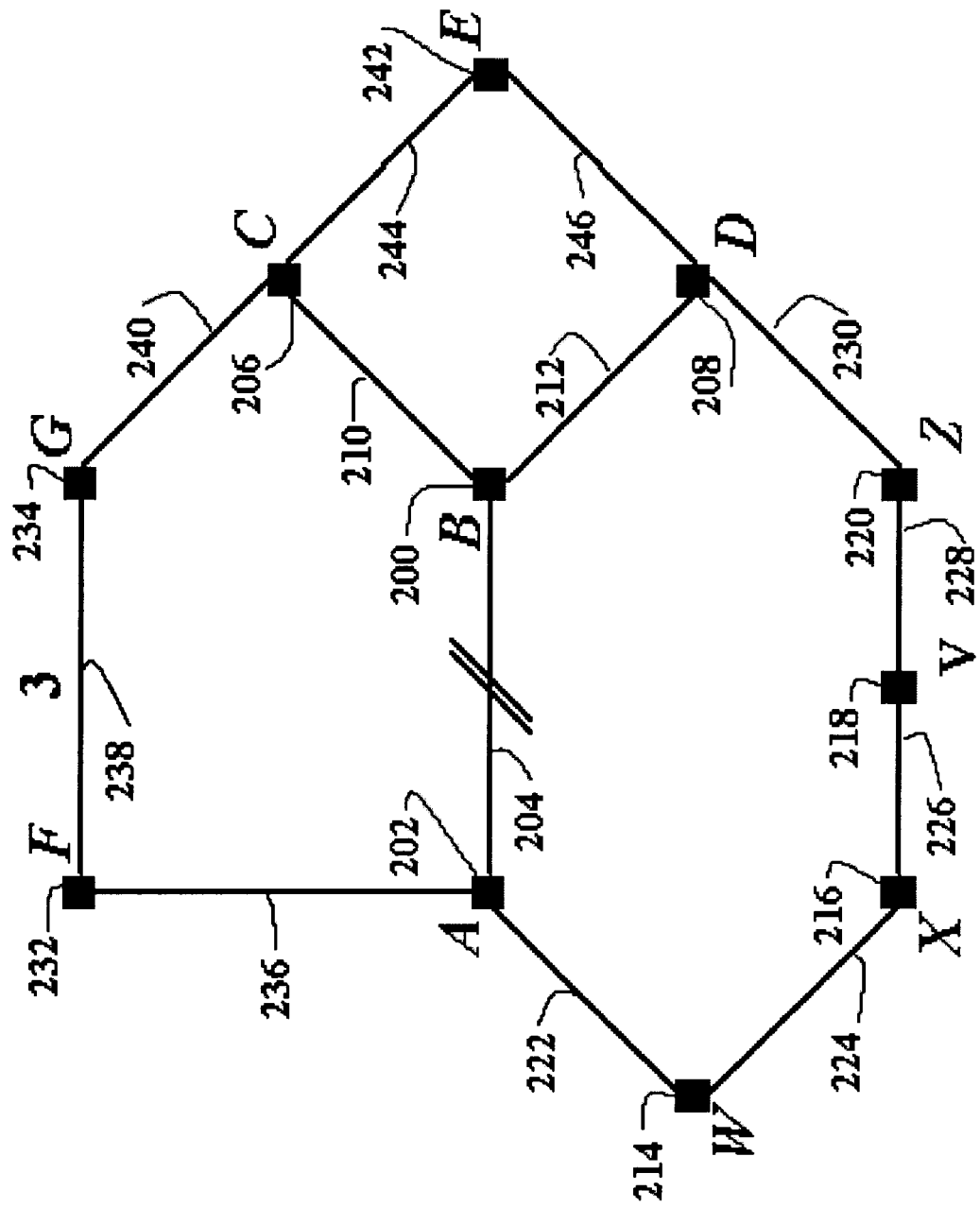
FIG. 7 is a representation of a network comprising a revised version of the network of FIG. 4 illustrating a method for forwarding a tunneled packet over multiple hops.

Another approach is described with reference to FIGS. 7 to 11. FIG. 7 shows a network diagram of an illustrative network comprising a revised version of the network of FIG. 4 in which components have been renumbered for the purposes of clarity. The network includes node B, the component to be traversed, reference 200, a neighboring node A, 202 and a link 204 joining them. Node B has two further neighbor nodes, nodes C and D reference numbers 206, 208 respectively joined by respective links 210, 212. Node A has an alternative path to node D via nodes W, X, V and Z, 214, 216, 218, 220 respectively and corresponding links 222, 224, 226, 228 and 230. Node A also has an alternative path to node C via nodes F and G, 232, 234 and corresponding links 236, 238, 240. Node E, 242, is reachable by either node C or node D by respective links 244, 246. All of the links have a cost 1 except for link 238 between nodes F and G, which has a cost 3.

Figure 8:
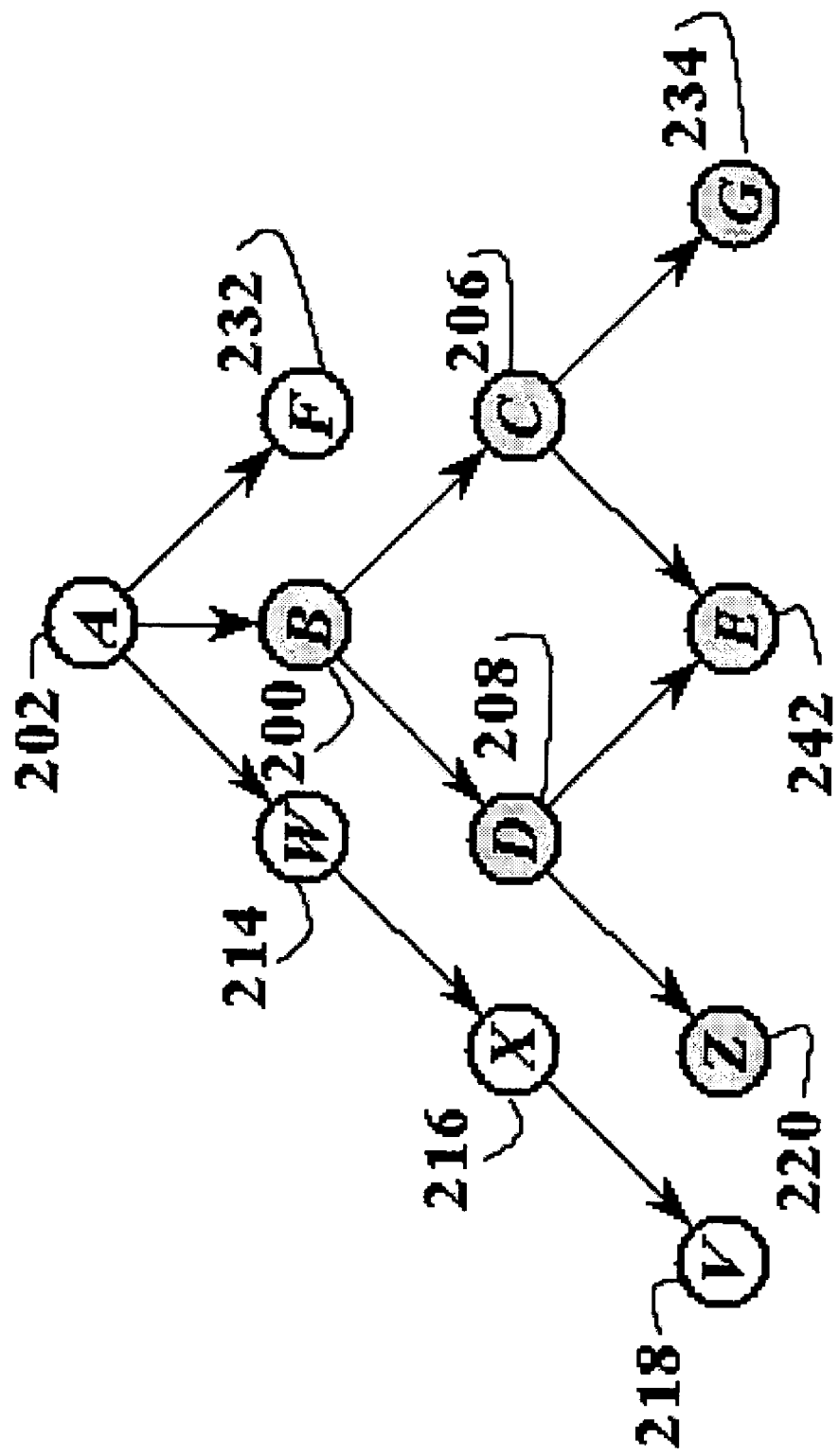
FIG. 8 is a spanning tree diagram for a node in the network shown in FIG. 7.

In the approach according to Miles et al in order to obtain the first set of nodes reachable from node A without traversing node B, a spanning tree of the type shown in FIG. 8, which shows a spanning tree diagram routed at node A illustrating the shortest path to each of the nodes, is constructed. Those nodes reachable via the failed component and hence excised are shown shaded grey, namely nodes B, C, D, E, G, Z. Even with directed forwarding the only additional nodes reachable are nodes Z (via node V) and node G (via node F).

Figure 9:
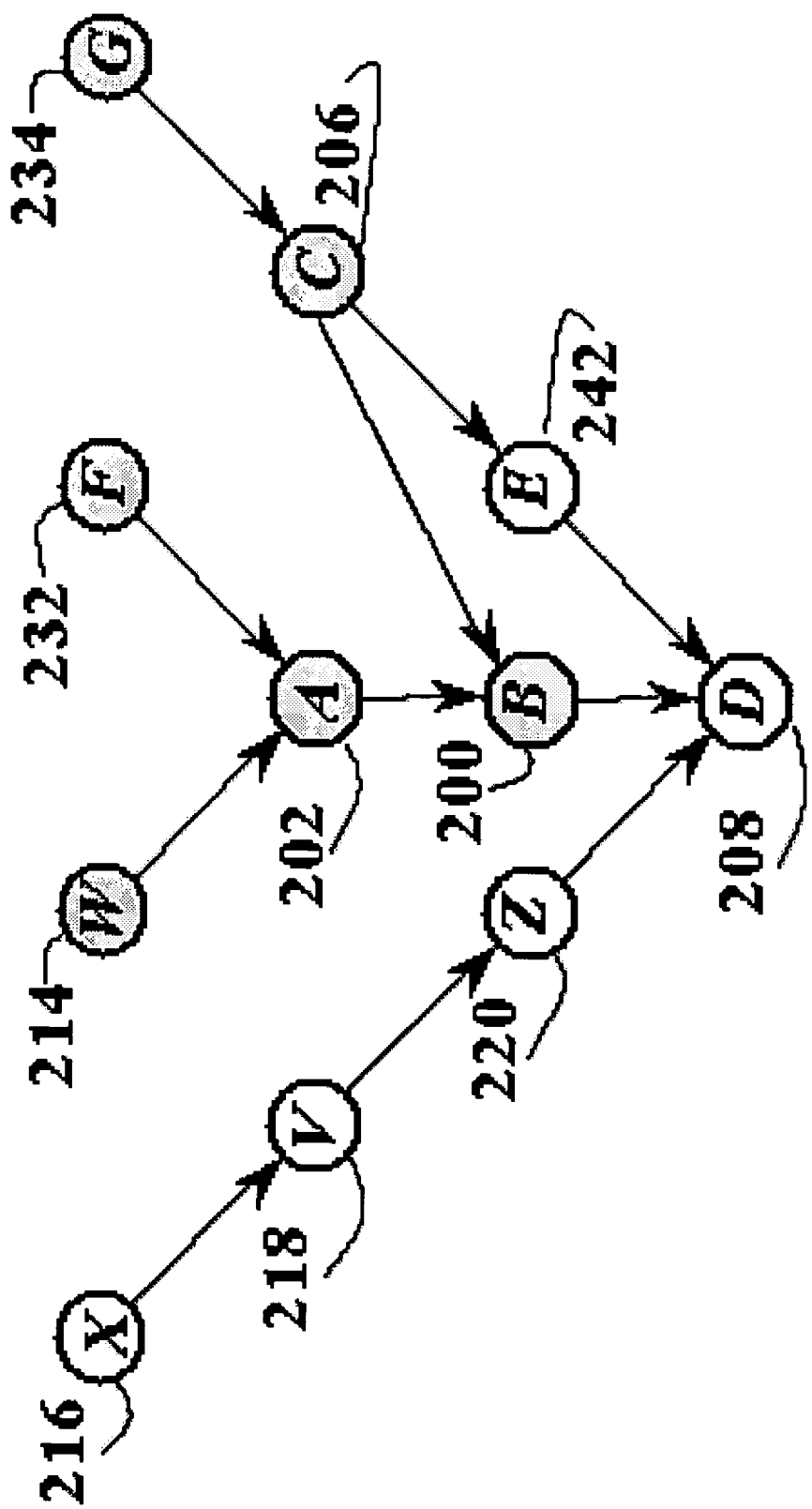
FIG. 9 is a reverse spanning tree diagram for a node in the network shown in FIG. 7.

Referring now to FIG. 9, which depicts the reverse spanning tree computed at router D, the repair path to router D can be computed. Nodes A, B, C, F, G and W are shown as shaded having been excised because it would have been necessary to traverse the B D link to reach node D from these nodes (nodes C and G are excised because they are on an equal cost path split that could take traffic via the B-D link). As described in more detail in Miles et al the set of achievable release points from router A to form a repair path to router D is given by the intersection of the nodes reachable from node A and the nodes which can reach node D taking into account directed forwarding, that is:

$$\{A,F,G,W,X,V,Z\} \cap \{D,E,X,V,Z\} = \{X,V,Z\}$$

Therefore a repair path from router A to D can use either X, V or Z as a release point where X and V represent coincident tunnel end points and release points and Z must be reached by directed forwarding from V.

As shown in FIG. 8, where extended directed forwarding is available, the normal SPF is run to determine the set of nodes which could be tunnel endpoints. The current cost of each reachable node then is replaced with the negative of the cost from that node back to node A which can be obtained from a reverse SPF routed at node A. So, for example, referring to FIG. 7, the costs of nodes F and W are both replaced by a cost minus 1 (negative the costs of links 236 and 222 respectively), the cost of node X by a cost of minus 2 and the cost of node C by a cost minus 2. As a result when the spanning tree at router A is calculated the effect is that nodes F, W, X and V are reached at cost zero (by adding the positive cost from node to the negative link cost at the respective node) and hence the SPF is effectively calculated from the respective node F, W, X or V.

Figure 10:
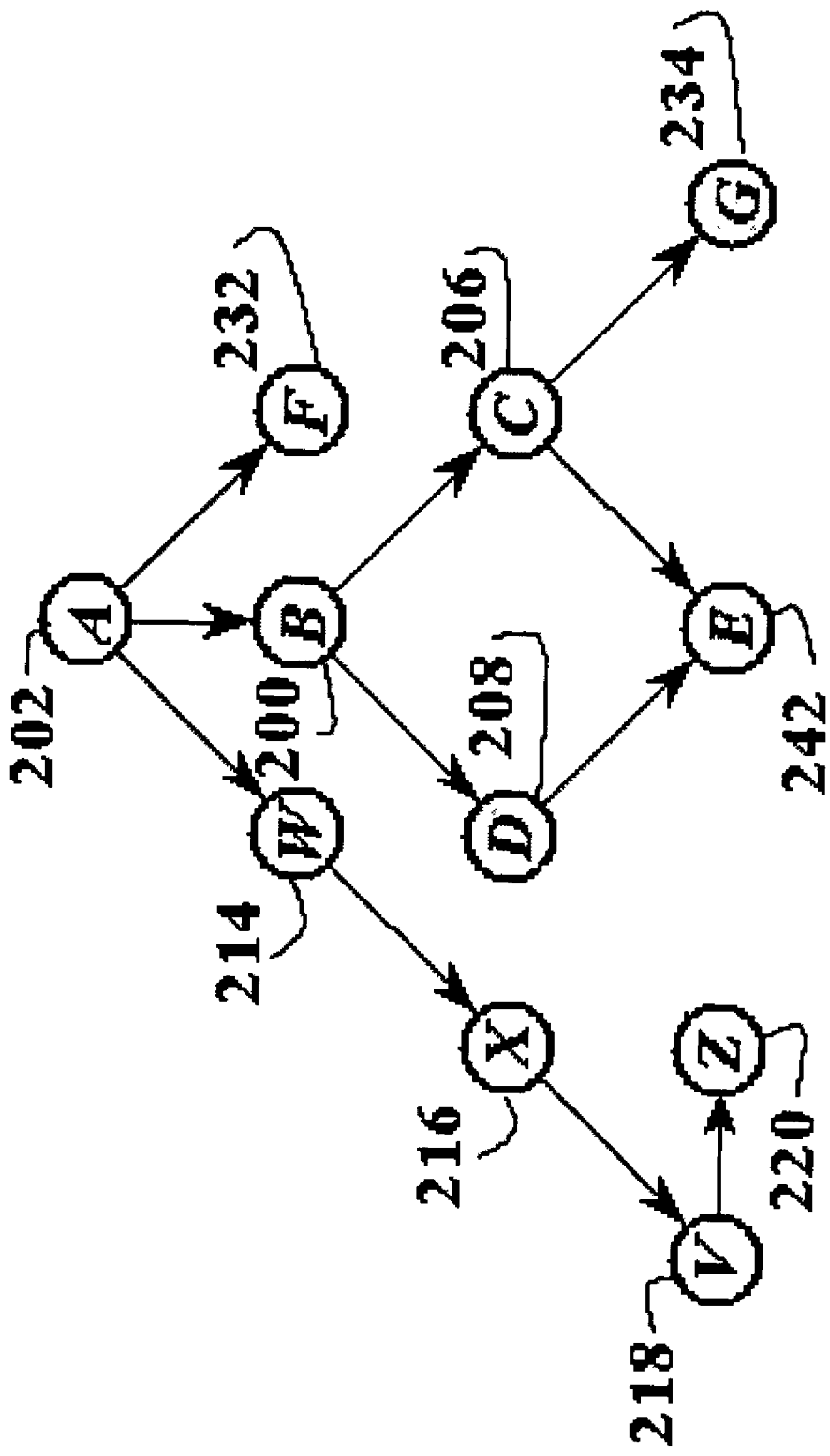
FIG. 10 is an extension of the spanning tree shown in FIG. 8.

FIG. 10 is the spanning tree diagram routed at node A of FIG. 8 but extended according to this approach and it will be seen that node Z is additionally reachable from node A via node V. This is because the cost to node Z from node A is 4 (via links 222, 224, 226 and 228) minus the cost from node V to node A giving a net cost of 1 whereas the cost via node B would have been 3 via links 208, 212 and 230. However nodes D and G and nodes downstream thereof remain unreachable as they are on an equal cost path split (cost to node D via A, B is 2 and effective cost via A, V also 2, cost to node G via B, 3 and effective cost via node F also 3). However the approach can be applied again at node Z extending the spanning tree further and indeed can be applied any number of times thereafter as the set of reachable nodes expands.

The resulting sub-tree as shown in FIG. 10 is the set of nodes which can be reached via double encapsulation and the intersection of this set with the set of nodes obtained through the reverse spanning tree of FIG. 9 gives the destination addresses of the inner IP encapsulation. It will be appreciated that the approach can be extended to all the other neighbors of node B as appropriate. It will be recognized that the approach described with reference to FIGS. 7 to 10 can be applied generally when it is desired to calculated extended spanning trees and hence beyond the context of the method described specifically herein.

Figure 11:
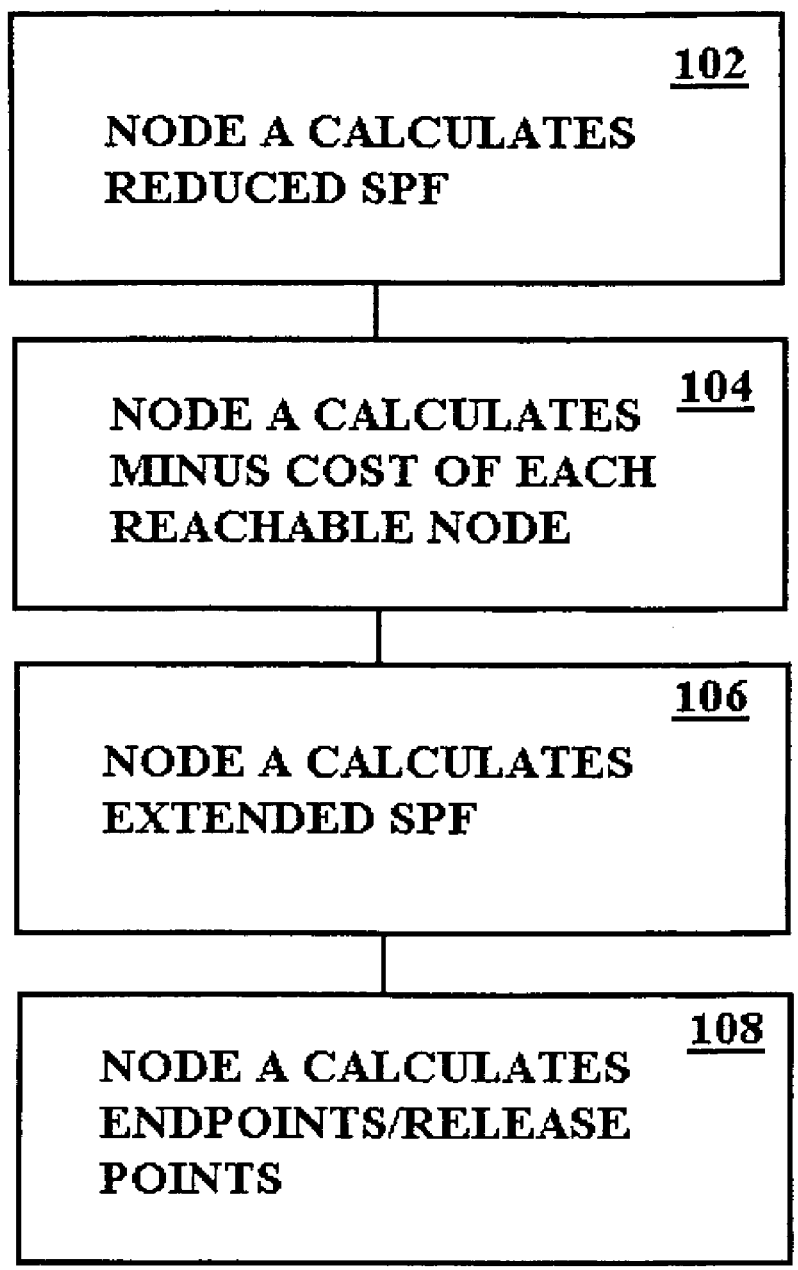
FIG. 11 is a flow diagram illustrating in more detail the steps involved in obtaining the extended spanning tree of FIG. 10.

FIG. 11 is a flow diagram illustrating in more detail the method for calculating the extended spanning tree. In block 102 node A calculates its reduced SPF excising nodes reachable via node B. In block 104 node A calculates minus the cost of reaching each remaining reachable node. In block 106 node A calculates the extended SPF incorporating the minus cost and in block 108, in the case where a repair path is being calculated, node A calculates tunnel end points or directed forwarding release points from the intersection with the reverse SPF rooted at a target node.

In certain circumstances additional optimizations and considerations to the method described herein can be taken into account. Where transition routes are implemented and, referring to FIG. 4, node A was already implementing the method for a repair through router B then router A must abandon the repair attempt as this is a double failure. In the case that the method was being applied for a normal IP tunnel end point at B, upon failure detection node A must stop applying the method and forward the complete tunnel packets over the repair path around B. Where the forwarding node institutes a repair path around a failed node to a tunnel end point having an adjacent forwarding node, then the adjacent forwarding node can continue to apply the method herein described.

In some instances there is a need to apply additional processing on a tunnel packet (for example, processing Access Control Lists (ACLs), flow categorization using a technology such as Cisco's Netflow, or performing Reverse Path Forwarding (RPF) checks) before the inner payload is forwarded in which case the method described herein can be suppressed.

The mechanism by which the method and optimizations discussed above are implemented will be well known to the skilled reader and do not require detailed discussion here. The forwarding node for example can identify a tunneled packet with destination of a neighbor node by examining the IP protocol type of a packet to determine that it is a tunnel packet, and observing that the destination address in the outer header is an immediate neighbor (from the routing protocol).

Similarly the additional code required to implement the method such as identifying and stripping the packets as well of course as encapsulation of the packets in the first place will be apparent to the skilled reader and a simpler modification of the existing code.

4.0 Implementation Mechanisms—Hardware Overview

Figure 12:
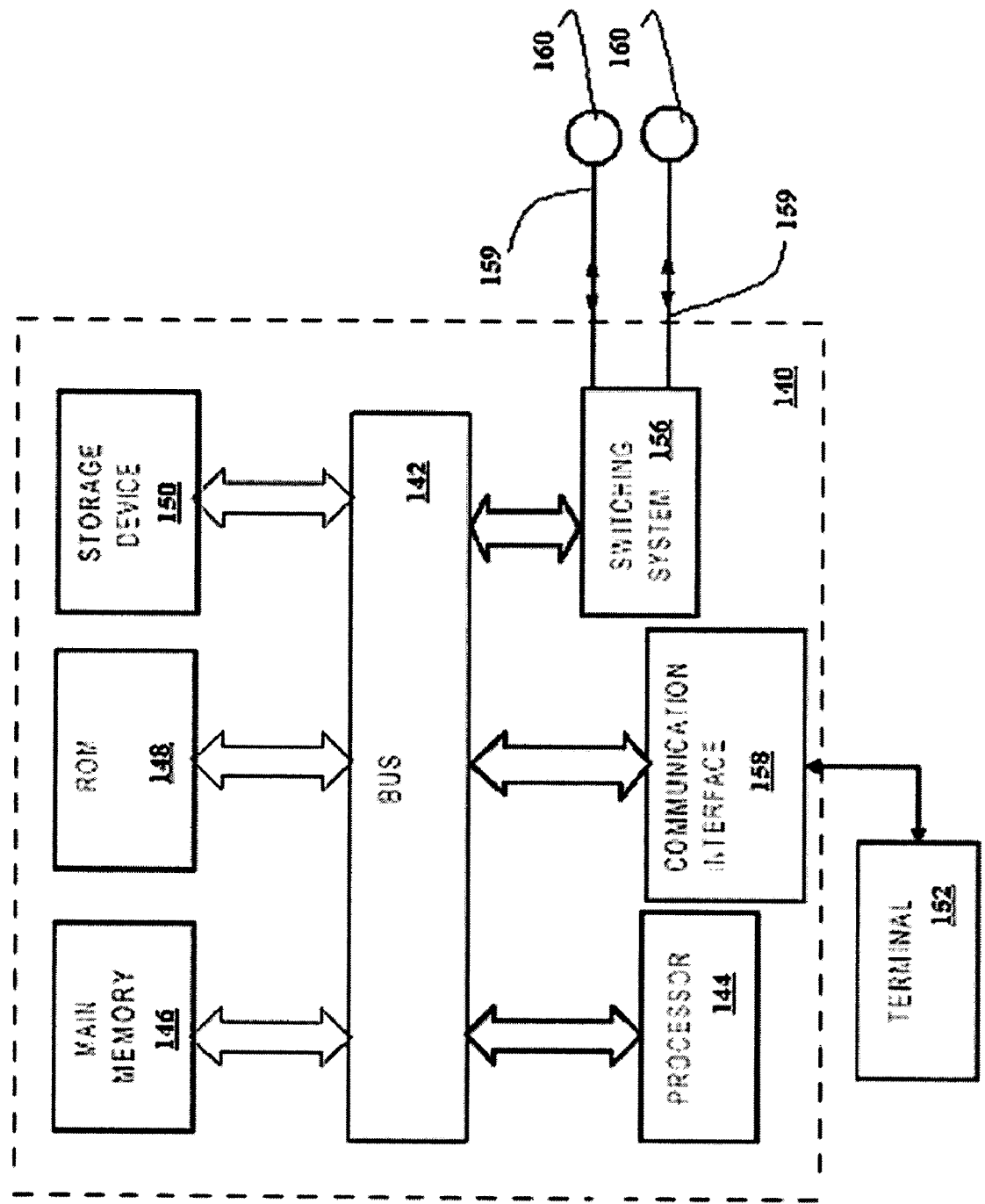
FIG. 12 is a block diagram that illustrates a computer system upon which a method for forwarding a tunneled packet may be implemented.

FIG. 12 is a block diagram that illustrates a computer system 140 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 also may be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a forwarding node the above described method of forwarding a tunneled packet. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any storage medium that participates in providing instructions to processor 144 for execution. Such a medium may take many forms, including, but not limited to, non-volatile media, and volatile media. Non-volatile media includes, for example, optical or magnetic disks, such as storage device 150. Volatile media includes dynamic memory, such as main memory 146.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the worldwide packet data communication network now commonly referred to as the "Internet".

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

Processor 144 may execute the received code as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism can be adopted to implement the invention. The method steps set out can be carried out in any appropriate order and aspects from the examples and embodiments described juxtaposed or interchanged as appropriate.

It will be appreciated that any appropriate routing protocol can be used such as Intermediate System-Intermediate System (IS-IS) or Open Shortest Path First (OSPF). Similarly any appropriate network can provide the platform for implementation of the method.

Although the computation of repair path/backup routes as discussed as taking place at the relevant node the computation can equally occur at a remote node which then downloads paths to the relevant nodes. Similarly any protocol which supports tunneling may be adopted and various alternative packet configurations to those discussed in detail above can be adopted as appropriate.

What is claimed is:

1. A method of forwarding a tunneled packet having a header identifying a tunnel end point and a payload, in a data communications network, comprising the steps performed at a forwarding node of:
   receiving a notification that a tunnel ending at the tunnel end point has been constructed around a component in the data communications network;
   upon receiving the notification, recording a neighbor node comprising the tunnel end point and permission to remove headers for tunneled packets to the neighbor node;
   recognizing, based on routing protocol information, a tunneled packet comprising an address directly identifying the neighbor node to the forwarding node as the tunnel end point;
   removing the header and
   forwarding the payload to the neighbor node using the address directly identifying the neighboring node and without a lookup of a forwarding address;
   wherein the method is performed by one or more processors.

2. A method as claimed in claim 1 in which the recording step comprises a manual configuration recording step.

3. A method as claimed in claim 1, wherein the tunnel is a repair path around the component in the data communications network.

4. A method as claimed in claim 1 in which the payload is one of a further tunneled packet or a direct forwarded packet.

5. A method as claimed in claim 4 in which the tunneled packet is configured as one of IP/GRE/MPLS/IP-payload or IP/GRE/IP/GRE/IP-payload.

6. A method as claimed in claim 4 further comprising the step, at an originating node, of encapsulating the payload in a tunneled packet and tunneling the packet to the tunnel end point.

7. A data storage device storing one or more sequences of instructions for forwarding a tunneled packet having a header identifying a tunnel end point and a payload, in a data communications network, which instructions, when executed by one or more processors, cause the one or more processors to perform at a forwarding node:
receiving a notification that a tunnel ending at the tunnel end point has been constructed around a component in the data communications network;
upon receiving the notification, recording a neighbor node comprising the tunnel end point and permission to remove headers for tunneled packets to the neighbor node;
recognizing, based on routing protocol information, a tunneled packet comprising an address directly identifying a neighbor node to the forwarding node as the tunnel end point,
removing the header and
forwarding the payload to the neighbor node using the address directly identifying the neighboring node and without a lookup of a forwarding address.

8. An apparatus for forwarding a tunneled packet having a header identifying a tunnel end point and a payload, in a data communications network, comprising:
at a forwarding node:
one or more processors;
means for receiving a notification that a tunnel ending at the tunnel end point has been constructed around a component in the data communications network;
means for recording a neighbor node upon receiving the notification, the neighbor node comprising the tunnel end point and permission to remove headers for tunneled packets to the neighbor node;
means for recognizing, based on routing protocol information, a tunneled packet comprising an address directly identifying a neighbor node to the forwarding node as the tunnel end point,
means for removing the header and
means for forwarding the payload to the neighbor node using the address directly identifying the neighboring node and without a lookup of a forwarding address.

9. An apparatus as claimed in claim 8 in which the means for recording comprises means for manually configuring recordal.

10. An apparatus as claimed in claim 8, wherein the tunnel is a repair path around the component in the data communications network.

11. An apparatus as claimed in claim 8 in which the payload is one of a further tunneled packet or a direct forwarded packet.

12. An apparatus as claimed in claim 11 in which the tunneled packet is configured as one of IP/GRE/MPLS/IP-payload or IP/GRE/IP/GRE/IP-payload.

13. An apparatus as claimed in claim 11 further comprising means for encapsulating the payload in a tunneled packet and tunneling the packet to the tunnel end point.

14. An apparatus for forwarding a tunneled packet having a header identifying a tunnel end point and a payload, in a data communications network, the apparatus comprising:
one or more processors;
a network interface communicatively coupled to the processor and configured to communicate one or more packet flows among the processor and a network; and
a computer readable non-transitory medium comprising one or more sequences of instructions for forwarding a tunneled packet having a header identifying a tunnel end point and a payload, in a data communications network, which instructions, when executed by one or more processors, cause the one or more processors to perform
at a forwarding node:
receiving a notification that a tunnel ending at the tunnel end point has been constructed around a component in the data communications network;
upon receiving the notification, recording a neighbor node comprising the tunnel end point and permission to remove headers for tunneled packets to the neighbor node;
recognizing, based on routing protocol information, a tunneled packet comprising an address directly identifying a neighbor node to the forwarding node as the tunnel end point,
removing the header and
forwarding the payload to the neighbor node using the address directly identifying the neighboring node and without a lookup of a forwarding address.

15. A method of configuring a forwarding node in a data communications network to process tunneled packets having a header identifying a tunnel end point and a payload, comprising the steps, at a notifying node, of:
for a forwarding node and a tunnel end point both in the same data communication network and both transmitting tunneled packets using the same data communication protocol:
constructing as a repair path around a component in the data communications network a tunnel having a tunnel end point prior to issuing a notification from the notifying node;
notifying a forwarding node of the identity of the tunnel end point; and
permitting the forwarding node to process tunneled packets to the tunnel end point by removing the header and forwarding the payload to the tunnel end point using an address directly identifying a neighboring node and without a lookup of a forwarding address;
wherein the method is performed by one or more processors.

16. A method as claimed in claim 15 in which the notifying node is the tunnel end point.

17. A method as claimed in claim 15 in which the forwarding node is a neighbor node to the tunnel end point.

18. A data storage device storing one or more sequences of instructions for configuring a forwarding node in a data communications network to process tunneled packets having a header identifying a tunnel end point and a payload, which instructions, when executed by one or more processors, cause the one or more processors to perform
at a notifying node:
for a forwarding node and a tunnel end point both in the same data communication network and both transmitting tunneled packets using the same data communication protocol:

constructing as a repair path around a component in the data communications network a tunnel having a tunnel end point prior to issuing a notification from the notifying node;

notifying a forwarding node of the identity of the tunnel end point; and permitting the forwarding node to process tunneled packets to the tunnel end point by removing the header and forwarding the payload to the tunnel end point using an address directly identifying a neighboring node and without a lookup of a forwarding address.

19. An apparatus for configuring a forwarding node in a data communications network to process tunneled packets having a header identifying a tunnel end point and a payload, comprising:

one or more processors;

for a forwarding node and a tunnel end point both in the same data communication network and both transmitting tunneled packets using the same data communication protocol:

means for constructing as a repair path around a component in the data communications network a tunnel having a tunnel end point in which the means for constructing the repair path is arranged to construct the repair path prior to issue of a notification from a means for notifying;

means for notifying a forwarding of the identity of the tunnel end point node; and means for permitting the forwarding node to process tunneled packets to the tunnel end point by removing the header and forwarding the payload to the tunnel end point using an address directly identifying a neighboring node and without a lookup of a forwarding address.

20. An apparatus as claimed in claim 19 in which the means for notifying is the tunnel end point.

21. An apparatus as claimed in claim 19 in which the forwarding node is a neighbor node to the tunnel end point.

22. An apparatus for configuring a forwarding node in a data communications network to process tunneled packets having a header identifying a tunnel end point and a payload, the apparatus comprises one or more processors; a network interface communicatively coupled to the processor and configured to communicate one or more packet flows among the processor and a network; and a computer readable non-transitory medium comprising one or more sequences of instructions for configuring a forwarding node in a data communications network to process tunneled packets having a header identifying a tunnel end point and a payload, which instructions, when executed by one or more processors, cause the one or more processors to perform at a notifying node:

for a forwarding node and a tunnel end point both in the same data communication network and both transmitting tunneled packets using the same data communication protocol:

constructing as a repair path around a component in the data communications network a tunnel having a tunnel end point prior to issuing a notification from the notifying node;

notifying the forwarding node of the identity of the tunnel end point; and permitting the forwarding node to process tunneled packets to the tunnel end point by removing the header and forwarding the payload to the tunnel end point using an address directly identifying a neighboring node and without a lookup of a forwarding address.

23. A method of constructing a spanning tree from a first node in a data communications network having as components nodes and links, around a component, comprising the steps of:

computing the spanning tree, rooted at the first node, of available nodes which excludes nodes reachable by traversing the component, and assigning to an available node a positive of a cost of reaching the available node from the first node;

assigning to an available node a negative of a cost of reaching the first node from the available node assuming that an unavailable component is available; and re-computing the spanning tree taking into account the positive of the cost of reaching the available node from the first node and the negative of the cost of reaching the first node from the available node;

wherein the method is performed by one or more processors.

24. A data storage device storing one or more sequences of instructions for constructing spanning tree from a first node in a data communications network having as components nodes and links, around a component, which instructions, when executed by one or more processors, cause the one or more processors to perform computing the spanning tree, rooted at the first node, of available nodes which excludes nodes reachable by traversing the component, and assigning to an available node a positive of a cost of reaching the available node from the first node;

assigning to an available node a negative of a cost of reaching the first node from the available node assuming that an unavailable component is available; and re-computing the spanning tree taking into account the positive of the cost of reaching the available node from the first node and the negative of the cost of reaching the first node from the available node.

25. An apparatus for constructing a spanning tree from a first node in a data communications network having as components nodes and links, around a component, comprising:

one or more processors;

means for computing the spanning tree, rooted first at the node, of available nodes which excludes nodes reachable by traversing the component, and assigning to an available node a positive of a cost of reaching the available node from the first node;

means for assigning to an available node a negative of a cost of reaching the first node from the available node assuming that an unavailable component is available; and means for re-computing the spanning tree taking into account the positive of the cost of reaching the available node from the first node and the negative of the cost of reaching the first node from the available node.

26. An apparatus for constructing a spanning tree from a first node in a data communications network having as components nodes and links, the apparatus comprising:

one or more processors;

a network interface communicatively coupled to the processor and configured to communicate one or more packet flows among the processor and a network; and a computer readable non-transitory medium comprising one or more sequences of instructions for constructing the spanning tree from a first node in a data communications network having as components nodes and links, around a component, which instructions, when executed by one or more processors, cause the one or more processors to perform:

computing the spanning tree, rooted at the first node, of available nodes which excludes nodes reachable by traversing the component, and assigning to an available node a positive of a cost of reaching the available node from the first node;

assigning to an available node a negative of a cost of reaching the first node from the available node assuming that an unavailable component is available; and re-computing the spanning tree taking into account the positive of the cost of reaching the available node from the first node and the negative of the cost of reaching the first node from the available node.

* * * * *

UNITED STATES PATENT AND TRADEMARK OFFICE
CERTIFICATE OF CORRECTION

PATENT NO. : 7,864,708 B1
APPLICATION NO. : 10/620866
DATED : January 4, 2011
INVENTOR(S) : Stewart Frederick Bryant et al.

It is certified that error appears in the above-identified patent and that said Letters Patent is hereby corrected as shown below:

Title Page, Item (56) References Cited

Page 2, Line 6 Delete "7,009,286 B1   8/2006   Swallow" and insert --7,099,286 B1  8/2006  Swallow--

Signed and Sealed this
Twenty-second Day of March, 2011

David J. Kappos
*Director of the United States Patent and Trademark Office*